United States Patent [19]

Hirose et al.

[11] Patent Number: 4,650,210
[45] Date of Patent: Mar. 17, 1987

[54] SADDLE TYPE WHEELED VEHICLE FOR OFF-ROAD SERVICE

[75] Inventors: Takeo Hirose, Shizuoka; Takuji Nozue, Hamamatus, both of Japan

[73] Assignee: Suzuki Motor Company Limited, Japan

[21] Appl. No.: 786,942

[22] Filed: Oct. 11, 1985

[30] Foreign Application Priority Data

Jan. 30, 1985 [JP] Japan .................................. 60-16059
Jun. 11, 1985 [JP] Japan ................................ 60-126435

[51] Int. Cl.⁴ ............................................... B60G 3/00
[52] U.S. Cl. .................... 280/690; 180/215; 280/675
[58] Field of Search ............... 280/675, 690, 698, 701; 180/210, 215, 213, 73.2, 73.3

[56] References Cited

U.S. PATENT DOCUMENTS

| | | | |
|---|---|---|---|
| 3,064,749 | 11/1962 | Muller | 180/73.2 |
| 3,245,492 | 4/1966 | Herr | 180/73.3 |
| 4,046,403 | 9/1977 | Yoshida | 280/701 |
| 4,345,778 | 8/1982 | Minagawa | 280/701 |
| 4,478,305 | 10/1984 | Martin, II | 180/215 |
| 4,535,869 | 8/1983 | Tsutsumikoshi et al. | 180/311 |

Primary Examiner—John J. Love
Assistant Examiner—Kenneth R. Rice
Attorney, Agent, or Firm—McGlew and Tuttle

[57] ABSTRACT

A saddle-type vehicle for operation on irregular and uneven ground, wherein a pair of rear suspension arm assemblies each connected pivotally to the rear part of a main frame of the vehicle. The assemblies have suspension arm portions connected operatively at their middle points to the lower end of a shock absorber, and rear end portions disposed at a higher and/or inner position than front end portion thereof. The main frame has a pair of lower tubes connected rigidly with a corresponding pair of upper tubes by way of connecting members. The pair of lower tubes are formed at their midway portions to provide holding members for the front end portions of the suspension and these holding members are directed in the same direction as swing axes for the suspension assemblies.

5 Claims, 8 Drawing Figures

SADDLE TYPE WHEELED VEHICLE FOR OFF-ROAD SERVICE

BACKGROUND OF THE INVENTION (i) Field of the Invention

The present invention relates to an improvement in or relating to a saddle type vehicle employing a rear-wheel independent suspension system, and more particularly to an improved saddle type wheeled vehicle for off-road service which is designed to reduce changes in the camber aspect of its rear suspension system.

(ii) Description of the Prior Art

It is an essential requirement in the design of a vehicle for use on irregular and uneven ground that a driver of the vehicle may readily control the balance thereof while driving on the rough and uneven ground and also that the vehicle exhibits an excellent maneuverability. In this respect, there has been developed a four-wheeled vehicle of saddle-riding type, in which there are provided two wheels each on the front and rear axles.

It is generally known that a variety of vehicles of four-wheeled saddle-riding type have been developed which have a common basic construction as follows.

That is, the saddle-type four-wheeled vehicle of this type is designed with a main frame, on which a front pair of wheels and a rear pair of wheels are provided, each of these wheels having a tire of low internal pressure and with a relatively great area of contact upon the ground, which is so-called "a balloon tire". Also, this type of vehicle is generally equipped with a bar-handle for operating the front wheel steering mechanism, and it has a step structure upon which the driver may rest his feet on either side of the main frame.

While the rigid type suspension was once a common construction for this type of vehicle in the earlier designs, an improvement has been adopted in the meantime such that the front axle is equipped with the wishbone-type suspension, and the rear axle is provided with a rigid-axle unit suspension. One of the most recent type of suspension known, employs a rear suspension of independent type such as, for example, a diagonal swing axle type suspension.

However, when adopting an independent type suspension system for the rear wheels of a vehicle, it would be essential that a vehicle's frame has a substantial width, since an engine may take a substantial space in the middle thereof. Because of such a spatial restriction, when there is an equal distance across either pair of wheels, it is inevitable that the inclination of a tire with respect to the vertical line or the camber of a tire would become greater, particularly when running on irregular ground, owing to a relatively short extension of a suspension arm of the suspension system. This is an undesirable restriction in the conventional design of suspension for this type of vehicle.

In consideration of such an undesirable restriction in design which is particular to the conventional construction of a four-wheeled vehicle as noted above, it would be desirable to reduce such undesirable changes in the camber of a pair of wheels which may occurs particularly when running on irregular ground.

The present invention is essentially directed to the provision of an improved construction of a rear suspension for a wheeled vehicle of saddle riding type for use on irregular ground.

SUMMARY OF THE INVENTION

It is therefore a primary object of the present invention to provide an improved saddle-riding type vehicle for use on irregular ground which is equipped with low-pressure balloon tire, and in which a pair of rear suspension arms extending from the rear wheels are mounted pivotally at their outer ends onto the rear part of a main frame of the vehicle, the middle portion thereof being connected operatively to the lower ends of rear shock absorbers with the end of the rear part thereof being disposed in the upper and/or inner portions with respect to the fore end of the main frame, respectively.

It is another object of the invention to provide an improved saddle type vehicle for use on irregular ground, which is equipped with a main frame construction including members for holding both front and rear arms of a rear wheel suspension with a pair of left and right lower tubes connected to the upper members through paired connecting members for suspending the rear wheels midway of the lower tubes and the connecting members, wherein the lower tube is formed at its midway portion such that the orientation of the portion where the holding member for the fore arm of the rear suspension may coincide with the direction of motion of the swing axis of the rear suspension, and wherein the main frame is formed with the middle portion of the connecting member being curved in such a manner that the portion where the holding member for the rear arm of the rear suspension is provided may become narrower than the portion where the fore arm holding member is provided.

It is still another object of the invention to provide an improved saddle type vehicle for use on irregular ground with a rear suspension construction wherein the rear arm holding member of the rear suspension arm disposed on the connecting member is located in a position that is higher than the position of the fore arm holding member provided in the lower tube of the suspension.

Additional features and advantages of the invention will now become more apparent to those skilled in the art upon consideration of the following detailed description of a preferred embodiment exemplifying the best mode of carrying out the invention as presently perceived. The detailed description refers particularly to the accompanying drawings, in which like parts are designated with like reference numerals.

DETAILED DESCRIPTION OF A PREFERRED EMBODIMENT

Figure 1:
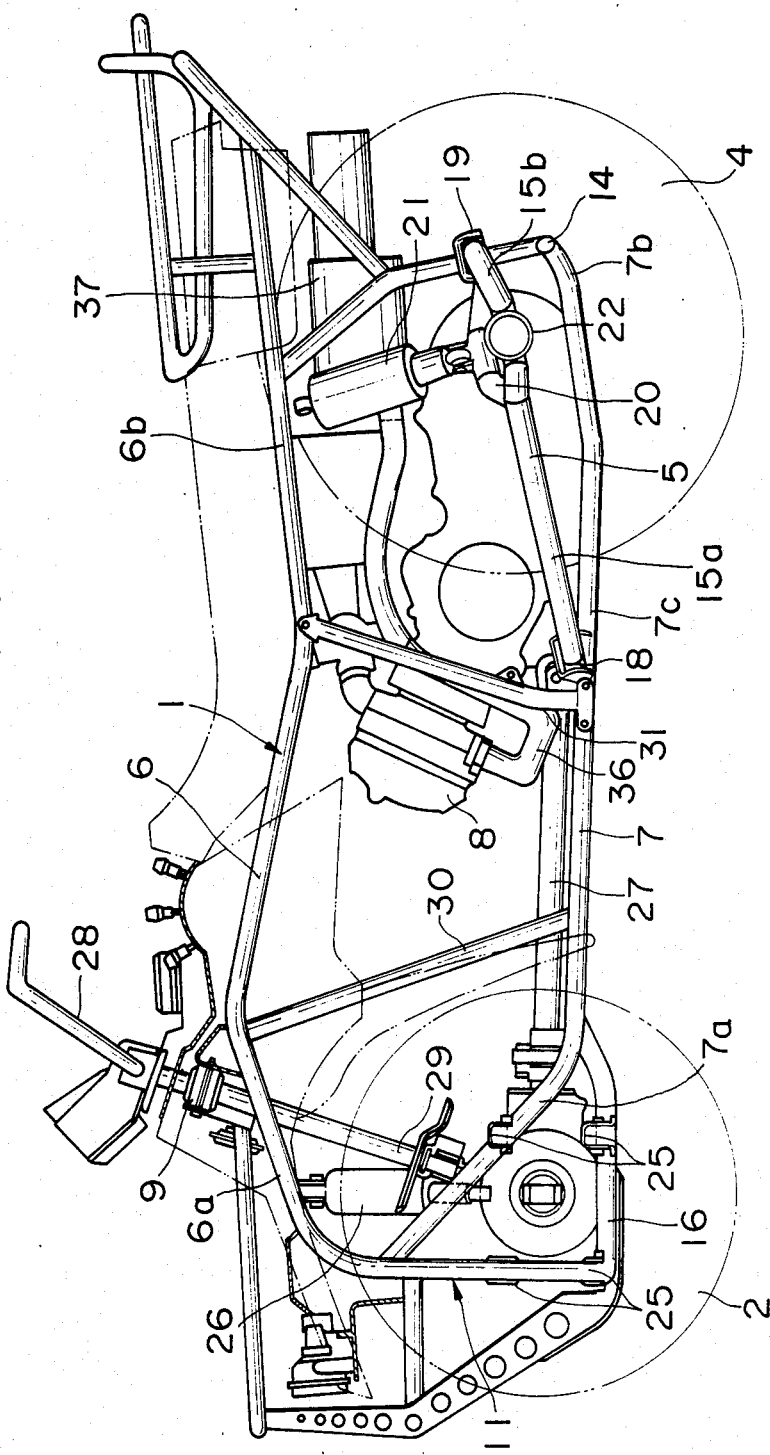
FIG. 1 is a general side elevational view showing by way of a preferred embodiment, an improved saddle type vehicle for use on irregular ground according to the present invention.
Figure 2:
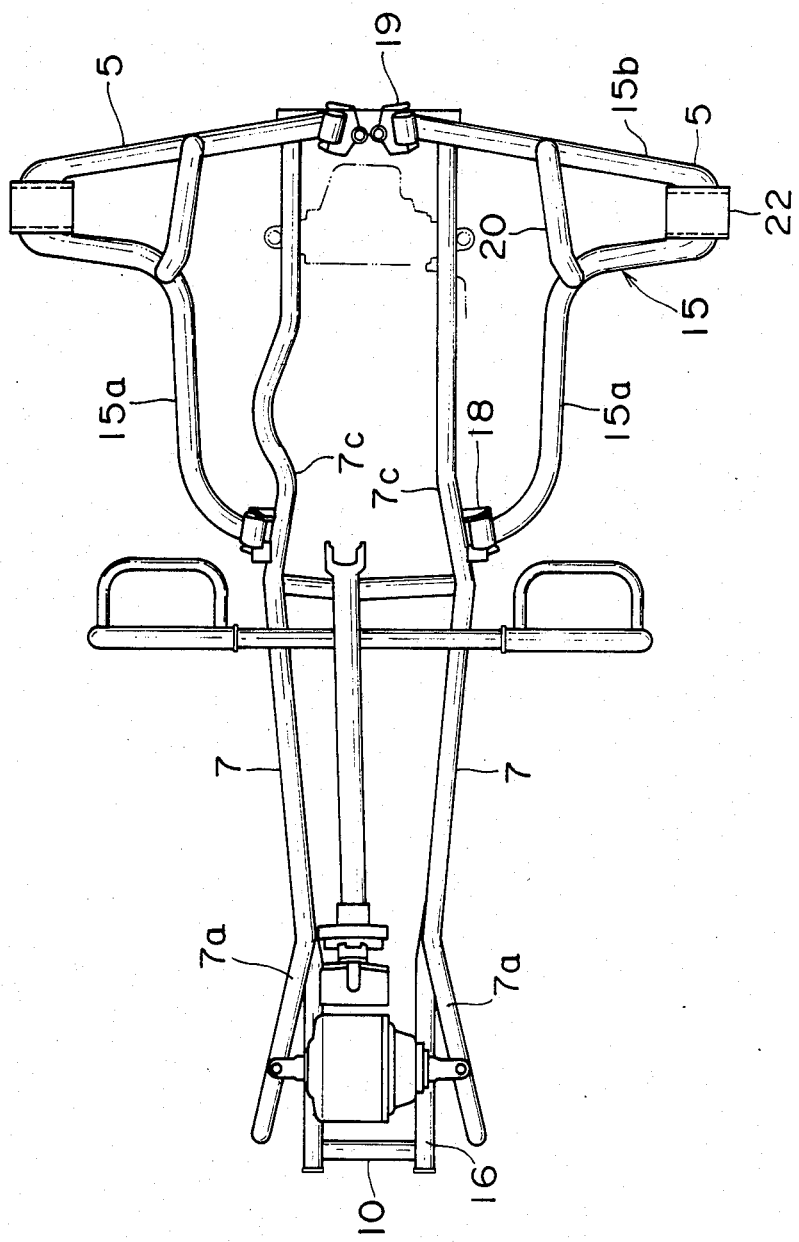
FIG. 2 is a top plan view showing a lower tube construction of an improved main frame of the vehicle.

The present invention relating to a saddle-type four wheeled vehicle which adopts a four-wheel independent suspension system will now be explained in detail by way of a preferred embodiment thereof in conjunction with accompanying drawings.

Referring firstly to FIGS. 1 through 5, there is shown generally in side elevation the construction of an improved saddle-type four wheeled vehicle equipped with a main frame designated 1 according to the invention, a pair of front wheels 2 employing a double-wishbone type front suspension 3 and a pair of rear wheels 4 with the Macpherson type rear suspension 5. Main frame 1 is formed with a box structure comprising a pair of upper tubes 6 and a pair of lower tubes 7, which are connected with each other by a plurality of connecting pipe segments in such a manner that there is defined a central opening or space for installing an engine 8 therein.

Figure 3:
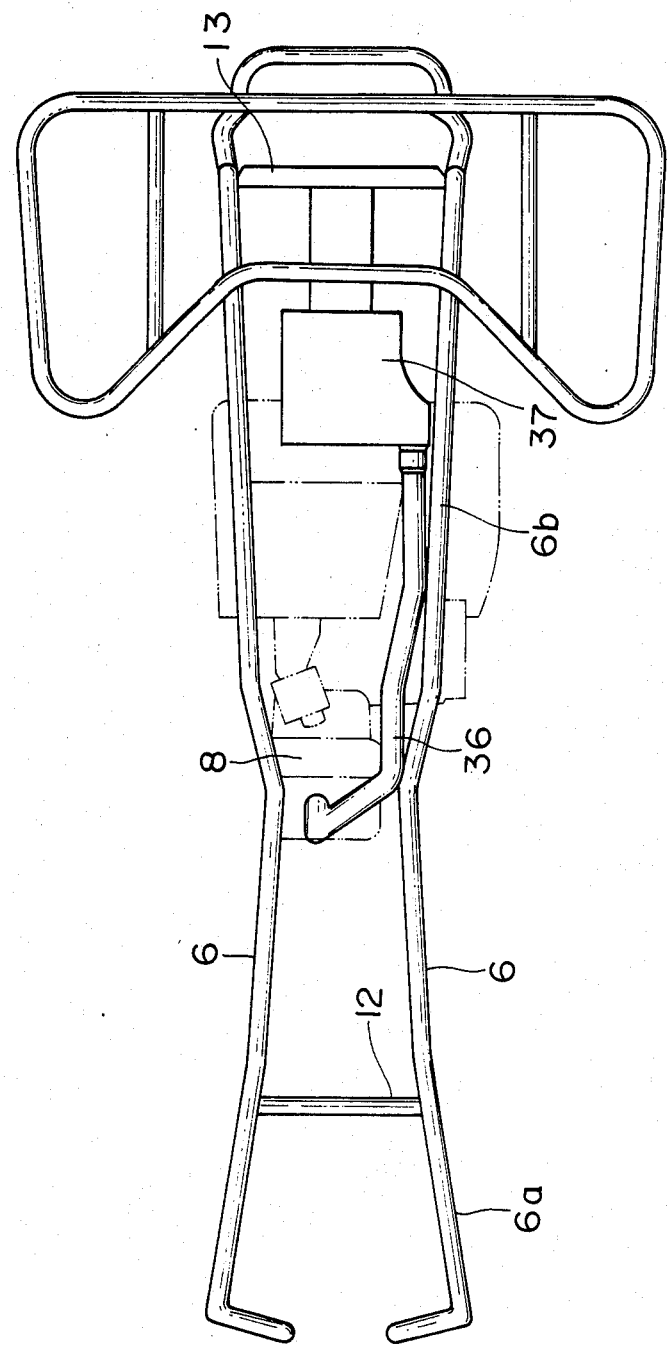
FIG. 3 is a similar plan view showing an upper tube construction of the main frame of the vehicle.

The pair of upper tubes 6 are formed in such a general shape that leading end portions 6a thereof for holding rigidly a steering head 9 of the vehicle, are slightly bent and extend at a slant downwardly toward the front and diverge away from each other. End portions 6a are then bent generally perpendicularly downwardly and approach each other. They are finally connected by a connecting pipe segment 10 (FIG. 4) so that a front gate structure 11 of the vehicle may be formed, as generally viewed in FIG. 1. Also, the pair of upper tubes 6 extend at their rear part slightly downwardly after the steering head portion 9 and then turn slightly upwardly in such a manner that there is formed a seat nesting rail portion 6b, which is also seen generally in FIG. 1. There are also shown upper tube connecting pipe segments 12, 13 extending across the pair of upper tubes 6 so as to connect the same together in a generally parallel relationship with each other (FIG. 3).

Figure 5:
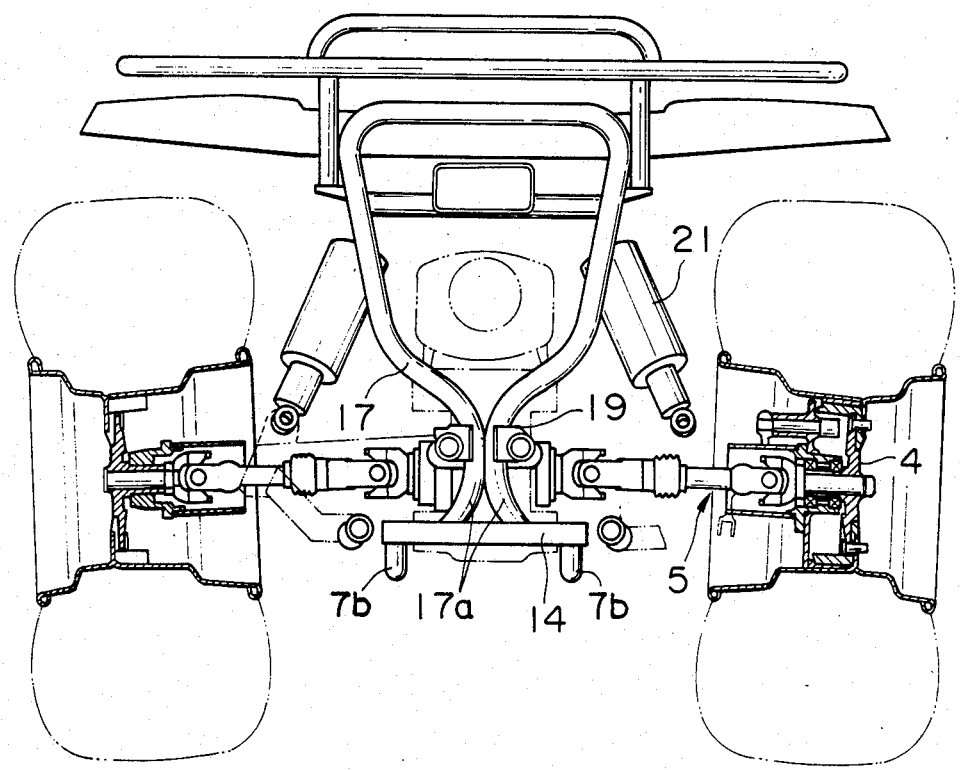
FIG. 5 is a rear end view of the same embodiment.
Figure 6:
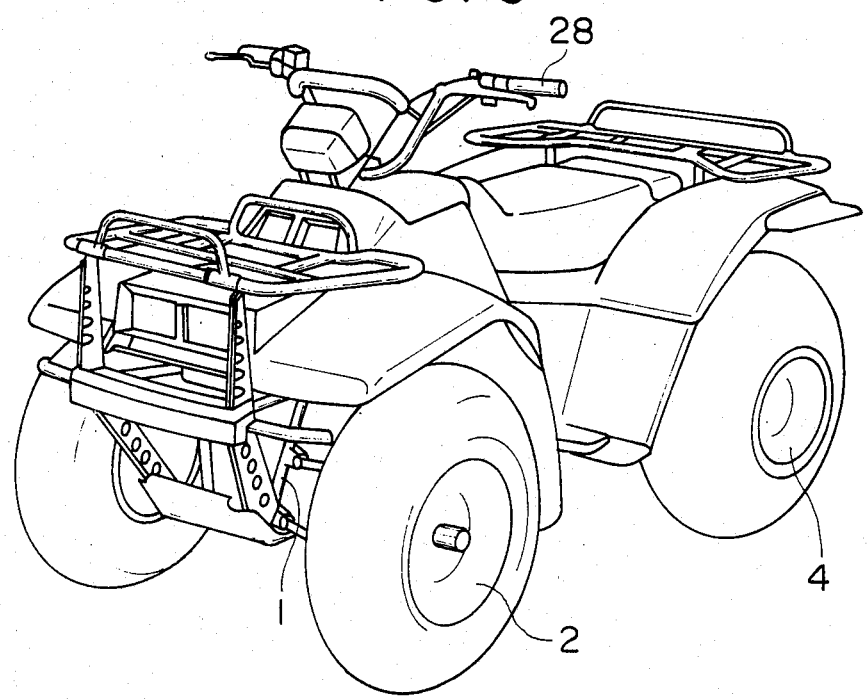
FIG. 6 is a general perspective view showing the appearance of an improved saddle-type four-wheeled vehicle according to the invention.

On the other hand, the pair of lower tubes 7 (FIGS. 1 and 2) are formed in such a manner that their leading end portions 7a are bent to slant upwardly till they meet the front gate portion 11 of the upper tubes 6 where they are connected rigidly together. Tubes 7 also have their rear end portions 7b extending toward the rear end of the vehicle where they are connected rigidly together by way of a connecting pipe segment 14 as seen in FIG. 5. The pair of lower tubes 7 have their middle portions 7c for pivotally holding front arms 15a of a pair of suspension arm assemblies 15 of the rear suspension 5 formed in the same direction as that of a swingable axis of the suspension arm assembly 15. There is also provided a connecting pipe segment 16 which is adapted to connect the leading end portion 7a of the lower tube 7 to the leading end portion 6a of the upper tube 6 on each side of the main frame.

In addition, a pair of connecting pipe segments 17 are provided at the rear end portion of the vehicle, which are adapted to connect across the connecting pipe segment 14 to connect the rear ends of the lower tubes 7 and the rear ends of the upper tubes 6. This pair of connecting pipes 17 are curved inwardly toward each other in such a generally X-shape as best seen in FIG. 5 that the portion 17a for pivotally holding the rear arm portion 15b of the suspension arm assembly 15 may become narrower in their lateral extension than the portion 7c to hold the front arm portion 15a of the suspension arm assembly 15. In this embodiment, the paired connecting pipes 17 are curved sharply to such an extent that they may contact closely with each other at their portions 17a for holding the rear arm portions 15b of the suspension arm assembly 15. On the other hand, the front arm portions 15a, extend in an arcuate fashion so that they are substantially longer than the rear arm portion 15b. There are also provided fixtures 18, 19 of a general C-shaped cross-section on the portions 7c of the lower tubes 7 for the pivotal holding of the front arm portion 15a of the suspension arm assembly 15 and on the portion 17a for the similar pivotal holding of the rear arm portion 15b, respectively.

This rear suspension 5 is of the type that is called a diagonal swing axle suspension system.

The suspension arm assembly 15 is formed at its middle portion in a generally trapezoidal shape defined by the front and rear arm portions 15a, 15b having a reinforcing pipe segment 20 extending across these arm portions, and this assembly is mounted operatively in position on the lower tube 7 in such a manner that its front arm portion 15a is pivotally held at the fixture 18 and its rear arm portion 15b is likewise pivotally held at the fixture 19, respectively. There is also provided a shock absorber assembly 21 extending workably between the reinforcing pipe segment 20 and a point of the upper tube 6 on both sides of the main frame of the vehicle. With such a construction, it is to be noted that the inner end of the rear arm portion 15b of the suspension arm assembly 15 may be disposed in a substantially upper and inner position with respect to the inner end of the front arm portion 15a.

Now referring to the mount of the rear wheels 4 of the vehicle frame 1, these wheels have axles (not shown) that are held individually and rotatably by wheel axle mount pipes 22 provided on the outer end of the suspension arm assembly 15, to which the driving power from the engine 8 is transmitted operatively.

Figure 4:
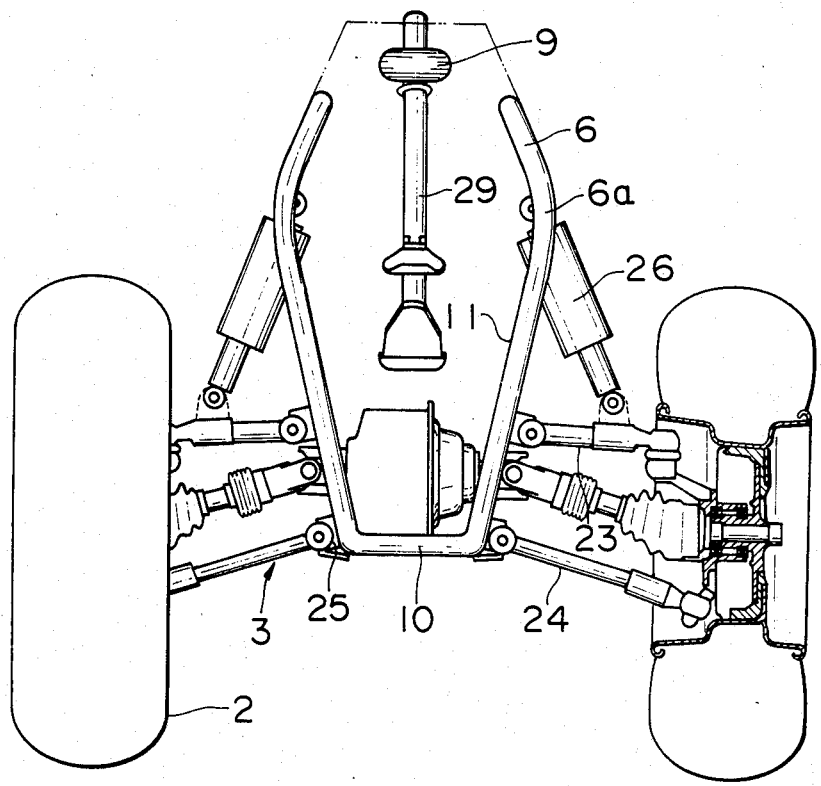
FIG. 4 is a front elevational view showing the same embodiment of the invention.

As best seen in FIG. 4, the front suspension assembly 3 has an upper arm portion 23 and lower arm portion 24 held pivotally by the front gate portion 11, the leading end portion 7a of the lower tube 7 and a fixture 25 disposed on the connecting pipe segment 16, respectively, on both sides of the main frame. There is also seen a shock absorber assembly 26 extending workably to hold the front wheels 2, also on the both sides of frame.

As is known to those skilled in the art, the front suspension is constructed according to the common four-wheel driving system of this type of vehicle such that the front wheels 2 are driven in rotation by the driving power transmitted from the engine 8 through a power transmission shaft 27, and also that they may be operated for steering by way of a steering system comprising a steering handle bar 28, a steering shaft 29 and a linkage mechanism (not shown).

Figure 7:
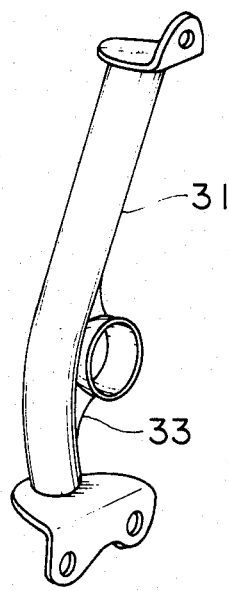
FIG. 7 is a perspective view showing an improved reinforcing pipe member to be installed on either side of an engine of the vehicle.
Figure 8:
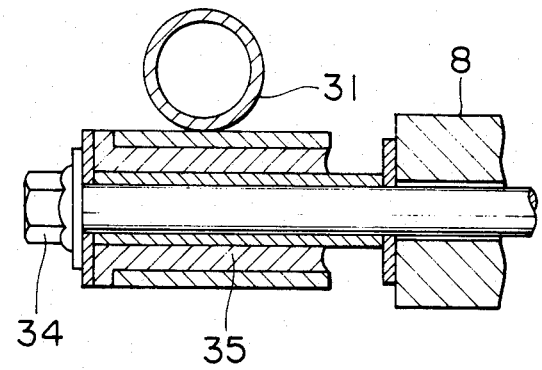
FIG. 8 is a fragmentary cross-sectional view showing an improved structure to mount an engine on the boss of a reinforced engine mount of the pipe structure.

It is also shown that there are provided reinforcing pipe segments 30, 31 extending across the upper tube 6 and the lower tube 7 so as to bind these tubes together. In this embodiment shown in FIG. 1, the reinforcing pipe segment 31 is constructed such that it is mounted releasably on one side of the main frame so that it may be secured onto the middle points of the upper tube 6 and the lower tube 7 by using bolts, and that it is provided with a boss 33 in the middle portion thereof for mounting the engine, as typically shown in FIG. 7. The engine 8 may be mounted, as shown in FIG. 8, in position by way of this mounting boss 33 using a mounting bolt 34 through a bushing 35.

An exhaust pipe 36 is provided which extends from the engine 8 on the rear side of the reinforcing pipe segment 31, positioned on the lateral side of the engine, rising once upwardly in its mid section and then turning to be connected to a muffler unit 37 on the rear part of the vehicle.

As reviewed fully hereinbefore, the saddle-type four wheeled vehicle having the substantial improvement in its main frame construction according to the present invention may present such advantageous effect as follows.

By virtue of the improved frame structure according to the invention as reviewed hereinbefore, it is practicably possible to have the rear arm portion 15b of the suspension arm assembly 15 with a relatively long workable extension by disposing its pivot point higher than the pivot point of the front arm portion 15a of the suspension arm assembly 15 and by making the lateral spacing between pivot points for rear arm portions 15b narrower than front arm portions 15a. Also, it is feasible in practice to have the front arm portion 15a extending substantialy longer than the normal arrangement by disposing it on the forward part of the main frame 1. From such a unique construction of the rear suspension system of the vehicle, there is attainable such an advantageous effect that possible changes in the camber of the rear wheels 4, as produced during operation on irregular ground, may eventually be made substantially smaller, thus contributing to the attainment of a due stability in the steering and running operations of the vehicle.

In addition, according to the specific location of the exhaust pipe 36 from the engine 8 extending on the rear side of the reinforcing pipe segment 31 as reviewed in this embodiment, it is advantageous that the reinforcing pipe segment 31 may serve as a heat insulating cover. By virtue of this arrangement, it is easier to mount and dismount the engine 8 by first removing the removable reinforcing pipe segment 31.

Further to the pivotal mounting of the rear suspension arm assembly onto the main frame of the vehicle, it is advantageous that the inner end on the rear side of the suspension arm portion is disposed in the upper and/or inner position with respect to its front side end, thus making it possible in practice to have the extension of the entire rear suspension arm substantially longer, and thus resulting in the advantageous effect of reducing changes in the camber of the rear suspension system, which may effectively bring a substantial improvement in stability, particularly in cornering operations of the vehicle.

The inventive improvement includes the formation of the main frame with its lower tube structure having a portion for the holding member of the front arm portion of the rear suspension arm assembly, which is designed to extend in the same direction as the axis of swinging motion of the rear suspention arm assembly. The middle portion of the connecting member is also formed in such a manner that the portion where the holding member for the rear arm portion of the suspension arm assembly is provided, is made substantially narrower in its width than that of the portion for the holding member of the front arm portion of the suspension arm assembly. By these measures, an advantageous effect is attained wherein the extension of the rear suspension arm assembly is substantially longer than that of the conventional arrangement, thus resulting in a substantial reduction of changes in the camber of the rear wheels particularly when operating on irregular ground. This also contributes to the improvement in the stability in the operation of the vehicle. In addition, by the provision of the connecting members to contact each other at their middle areas, it is practicably possible to have the rear arm portion of the suspension arm assembly made longer than in the conventional arrangement.

Also, by the provision of the holding member for the rear arm portion of the rear suspension arm assembly being at a higher point than that of the front arm portion of the suspension arm assembly that is provided on the lower tube, it is feasible in practice to the arm extension of the rear suspension arm assembly make substantially longer.

Furthermore, by forming the front arm portion of the rear suspension assembly in an arcuate fashion, thus making it substantially longer in its lateral extension, there is attainable the advantageous effect that changes in the camber of the rear wheels are reduced correspondingly.

While the present invention has been described in detail by way of specific preferred embodiments thereof, it is to be understood that the present invention is not intended to be restricted to the details of the specific constructions shown in the preferred embodiments, but to contrary, the present invention can of course be practiced in many other ways to an equal advantageous effect in accordance with the foregoing teachings without any restriction thereto and without departing from the spirit and scope of the invention.

It is also to be understood that the appended claims are intended to cover all of such generic and specific features particular to the invention as disclosed herein and all statements relating to the scope of the invention, which as a matter of language might be said to fall thereunder.

What is claimed is:

1. A saddle-type vehicle for use on irregular ground, comprising a pair of upper tubes, a pair of lower tubes, said upper and lower tubes together forming a space for an engine, front connecting segments connecting said upper tubes to said lower tubes, a pair of rear connecting segments each connecting one of said upper tubes to one of said lower tubes, each rear connecting segment being on one side of the vehicle, said rear connecting segments having middle portions which are bent to approach each other, each lower tube having a middle portion which is bent to extend in a direction approaching a middle of the vehicle toward the rear of the vehicle, a pair of rear suspension arm assemblies each having a forward arm portion with an inner end pivotally connected to said middle portion of one lower tube, each rear suspension arm assembly having a rear arm portion having an inner end pivotally connected to said middle portion of one of said rear connecting segments, said front arm portion being pivotally around an axis extending parallel to said middle portion of its respective lower tube, said front and rear arm portions having outer ends which are connected to each other, said pivotal connections of said inner ends of said rear arm portions being closer together and higher than said pivotal connections of said front arm portions, a pair of rear wheels mounted for rotation to said connected outer ends of said front and rear arm portions of said rear suspension arm assemblies.

2. A vehicle according to claim 1, wherein said middle portions of said rear connecting segments are connected to each other.

3. A vehicle according to claim 2, including a connecting pipe connected between said front and rear arm portions of each arm assembly positioned intermediate said inner and outer ends of said front and rear arm portions, and a shock absorber connected to each connecting pipe and one of said upper tubes.

4. A vehicle according to claim 2, wherein each front arm portion is arcuately bent and is longer than each rear arm portion of each arm assembly.

5. A vehicle according to claim 4, including a connecting pipe connected between each front arm portion and each rear arm for each arm assembly intermediate said inner and outer ends of said front and rear arm portions, and a shock absorber connected between each connecting pipe and one of said upper tubes.

* * * * *